United States Patent [19]

Nagahiro et al.

[11] Patent Number: 5,258,441
[45] Date of Patent: Nov. 2, 1993

[54] POLYIMIDE BASED FRICTION MATERIAL AND PREPARATION PROCESS OF THE MATERIAL

[75] Inventors: Taizo Nagahiro, Tokyo; Noboru Umemoto, Mie, both of Japan

[73] Assignees: Mitsui Toatsu Chemicals, Inc.; NTN-Rulon Corp., both of Tokyo, Japan

[21] Appl. No.: 887,600

[22] Filed: May 21, 1992

Related U.S. Application Data

[63] Continuation of Ser. No. 647,703, Jan. 3, 1991, abandoned.

[30] Foreign Application Priority Data

Jan. 8, 1990 [JP] Japan .................................. 2-408

[51] Int. Cl.$^5$ .................. C08J 5/14; C08K 3/26; C08L 79/08
[52] U.S. Cl. ..................... 524/425; 524/514
[58] Field of Search .................. 524/425, 514

[56] References Cited

U.S. PATENT DOCUMENTS 4,945,126  7/1990  Crosby et al. .................. 524/514

FOREIGN PATENT DOCUMENTS

| 0387450 | 9/1990 | European Pat. Off. . |
|---|---|---|
| 59-207980 | 11/1984 | Japan . |
| 60-144363 | 7/1985 | Japan . |
| 62-137436 | 6/1987 | Japan . |
| 638455 | 1/1988 | Japan . |

*Primary Examiner*—Paul R. Michl
*Assistant Examiner*—U. K. Rajguru
*Attorney, Agent, or Firm*—Burns, Doane, Swecker & Mathis

[57] ABSTRACT

A polyimide-based friction material which is excellent in heat resistance, abrasion resistance, stability of friction coefficient, can be readily obtained by molding, and is comprised of:

(a) from 30 to 96 parts by weight of a thermoplastic polyimide resin essentially consisting of recurring units of the formula:

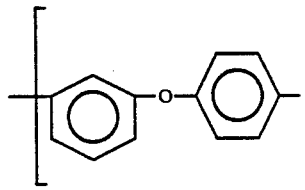
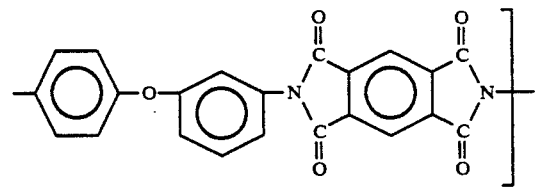

(b) from 2 to 30 parts by weight of fluoro resin, and
(c) from 2 to 40 parts by weight of calcium carbonate wherein the sum of components (a), (b) and (c) is 100 parts by weight.

12 Claims, No Drawings

POLYIMIDE BASED FRICTION MATERIAL AND PREPARATION PROCESS OF THE MATERIAL

This application is a continuation of application Ser. No. 07/647,703, filed Jan. 3, 1991 now abandoned.

BACKGROUND OF THE INVENTION a. Field of the Invention

The present invention relates to a polyimide-based friction material which is excellent in heat-resistance, abrasion resistance, friction characteristics and mechanical properties and to a process for preparing the friction material. The polyimide-based friction material of the invention can be widely utilized as friction parts in any fields, for example, automobiles, office machines and electric and electronic equipments.

b. Description of the Prior Art

Compositions obtained by using synthetic resins such as phenol resin or melamine resin as a binder and by bending mineral fibers such as asbestos as a filler have conventionally been used for a component of friction material for use in brakes and clutches. The friction material composed of these compositions, however, has a disadvantage that, in braking under high speed and high load and particularly under high temperature, friction coefficient decreases due to the effect of the heat-deteriorated ingredient of the transferred resin on the surface of the opposite material and brake performance is accordingly decreased. For example, the friction material composed of the above compositions containing the phenol resin exhibits marked reduction of friction coefficient at high temperatures in the range of 150° to 200° C. Asbestos fibers blended as a filler is unfavorable because it flies in the surroundings with abrasion of the friction material and is liable to give adverse effects on humans.

In order to remove the disadvantages of the friction material composed of the above composition, Japanese Patent Application Laid-open No. 144363 (1985) has disclosed a friction material obtained by using aromatic polyimide resin as a binder to enhance heat-resistance and adding various inorganic fillers. In view of the effect of asbestos fibers on humans, a friction material obtained by mixing polyimide resin with potassium titanate fibers and/or processed mineral fibers and iron powder has been known as described in Japanese Patent Application Laid-Open No. 207980 (1984). Brake materials prepared from these friction materials exhibit excellent abrasion resistance under high speed and high load. However, consistency of brake performance against temperature change on the frictional surface depending upon sliding time or temperature change in the atmosphere, that is, stability of friction coefficient has not always been satisfactory.

In order to enhance mechanical strengths such as flexural strength and impact strength, abrasion resistance and critical PV value (P=frictional surface pressure, V=friction velocity), it has been known to prepare a friction material by blending a binder with inorganic fibers such as glass fiber, asbestos fiber, potassium titanate fiber and processed mineral fiber, or heat-resistant organic fibers such as aramid fiber and aromatic polyester fiber. However, the friction material obtained by blending glass fiber causes serious damage to the opposite material. Friction material obtained by blending asbestos fiber, potassium titanate fiber or processed mineral fiber gives less damage to the opposite material as compared with glass fiber. However, the damage cannot be neglected when the blended amount is increased. Friction material obtained by blending heat-resistance organic fibers is excellent in causing no damage to the opposite material. The friction material, however, has poor machinability, the finish is coarse, and the so-called surface smoothness is poor. These properties give adverse effects on the dimensional tolerance of mechanical parts and also on the time dependent variation of friction coefficient.

As to friction material without containing these fibrous fillers, Japanese Patent Application Laid-Open No. 137436 (1987) has disclosed a polyimide base friction material obtained by blending fluoro resin, transition metals and/or transition metal oxides to non-thermoplastic aromatic polyimide resin. The aromatic polyimide resin, however, cannot be processed by fusion method such as injection molding and can only be processed by hot compression molding. Consequently, manufacture of molded articles having a complex shape has very low productivity and high cost.

SUMMARY OF THE INVENTION

The one object of the present invention is to provide a friction material having excellent heat resistance, abrasion resistance, productivity and stable friction coefficient and to provide a process for preparing the friction material.

One aspect of the present invention is a polyimide-based friction material comprising:

(a) from 30 to 96 parts by weight of a thermoplastic polyimide resin essentially consisting of recurring units of the formula:

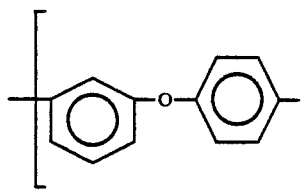

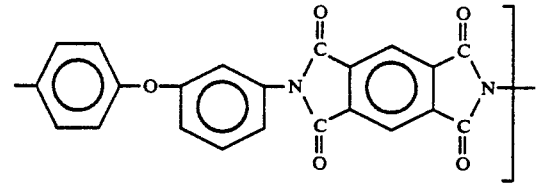

(b) from 2 to 30 parts by weight of fluoro resin, and
(c) from 2 to 40 parts by weight of calcium carbonate wherein the sum of components (a), (b) and (c) is 100 parts by weight. Another aspect of the present invention is a process for preparing the polyimide-based friction material comprising the step of molding the composition comprising the components (a), (b) and (c).

DESCRIPTION OF THE PREFERRED EMBODIMENTS

The thermoplastic polyimide resin obtained by the addition of fluoro resin and calcium carbonate in the invention exhibits synergistic effect over each component. The resin is hence extremely excellent in abrasion resistance, does not impair the opposite material and has a stable friction coefficient against temperature change. The resin can be processed with ease by injection molding and other melt-processing methods and also has excellent productivity. Consequently, the friction material comprising these components satisfies the above various properties which have been desired for conventional friction materials and can be mentioned as the best friction material in overall point of view.

No particular restriction is imposed on the preparation process of the thermoplastic polyimide resin in the present invention. However, as a common process, 4,4,-bis(3-aminophenoxy)biphenyl of the following formula:

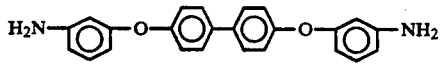

is reacted with pyromellitic dianhydride to form polyamic acid and the polyamic acid thus obtained is subjected to dehydrating cyclization reaction to give polyimide. The polyimide for use in the present invention has thermoplastic property.

The inherent viscosity of the thermoplastic polyimide in the invention differs to a certain extent depending upon the kind of friction material and hence the optimum value cannot be strictly defined. The inherent viscosity, however, is generally from 0.35 to 0.80 dl/g, preferably from 0.45 to 0.55 dl/g.

The proportion of the thermoplastic polyimide resin is in the range of from 30 to 96 parts by weight, preferably from 40 to 90 parts by weight.

The fluoro resin which can be used for the invention include, for example, tetrafluoroethylene resin (referred to as PTFE), tetrafluoroethylene-perfluoroalkyl vinyl ether copolymer (referred to as PFA), tetrafluoroethylene-hexafluoropropylene copolymer, and ethylenetetrafluoroethylene copolymer. The amount of the fluoro resin added is in the range of from 2 to 30 parts by weight, preferably from 3 to 28 parts by weight. Amounts of the fluoro resin less than 2 parts by weight cause inferior sliding property. On the other hand, addition amounts exceeding 30 parts by weight cause inferior abrasion resistance and mechanical properties.

No particular restriction is placed upon the calcium carbonate used in the invention. Commonly marketed calcium carbonate can be used without trouble. The amount of calcium carbonate added is in the range of from 2 to 40 parts by weight, preferably from 3 to 35 parts by weight. Amounts of calcium carbonate less than 2 parts by weight lead to inferior abrasion resistance or unstable friction coefficient. On the other hand, the amounts exceeding 40 parts by weight result in inferior mechanical properties and abrasion resistance.

Various kinds of fillers can be added unless the effect of the invention is impaired.

Exemplary fillers which can be used include organic heat-resistance macromolecular materials such as aromatic polyether ketone resin, polyetherimide resin, polyether sulfone resin, polyamideimide resin, heat-resistant polyamide resin, phenol-based resin, aromatic polyester resin, polyphenylene sulfide resin and silicone resin; heat-conductivity improving inorganic powders such as graphite and metal or oxides of zinc, aluminum and magnesium; inorganic powders such as glass beads, silica balloons, diatomaceous earth, magnesium carbonate, calcium oxide, calcium fluoride and calcium hydroxide; lubrication improving inorganic powders such as molybdenum disulfide, carbon and molybdenum trioxide; inorganic pigments such as iron oxide, cadmium sulfide, cadmium selenide and carbon black; and additives for internal lubrication such as silicone oil, ester oil, fluorine oil, polyphenylene ether oil, waxes and zinc stearate.

No particular restriction is imposed on the mixing method of above mentioned thermoplastic polyimide resin, fluoro resin, calcium carbonate and other additives. Raw materials may be individually fed to a melt-mixer, or may be previously dry-blended by using a mixer such as Henschel-mixer, ball mill and tumbler mixer and thereafter melt-mixed by using hot rolls, kneader, bambury mixer or screw extruder to form pellets for use in processing. Processing can of course be carried out by compression molding or sinter molding. More preferred molding methods in the invention are injection molding or extrusion molding by using an uniformly molten blend which can carry out production in high efficiency.

Further, in order to improve heat-resistance, mechanical properties and sliding properties, formed articles may be heat-treated at temperature of from 280° to 340° C. for 2 to 10 hours.

The polyimide-based friction material of the invention is excellent in heat-resistance, abrasion resistance, productivity and mechanical properties, exhibits a moderately high friction coefficient which is stable against temperature change, and does not impair the opposite material.

The friction material of the invention can be widely utilized for parts in many fields, for example, automobiles, office machines, electric and electronic equipments, space and aeronautic members, and industrial machinery. The friction material of the invention is preferably utilized in particular for the friction material of precision instruments such as stator material of an ultrasonic motor.

The present invention will hereinafter be illustrated further in detail by way of examples.

Raw materials used for the examples and the comparative examples are summarized below.

(1) Aromatic polyimide resin

To a reaction vessel equipped with a stirrer, reflux condenser and nitrogen inlet tube, 3.68 kg (10 moles) of 4,4'-bis(3-aminophenoxy)biphenyl and 32.9 kg of N,N-dimethylacetamide were charged and 2.125 kg (9.75 moles) of pyromellitic dianhydride was added at room temperature in a nitrogen atmosphere with caution to prevent temperature rise of the mixture. Stirring was continued for 20 hours at room temperature to obtain a polyamic acid solution.

To the polyamic acid solution, 2.02 kg (20 moles) of triethylamine and 2.55 kg (25 moles) of acetic anhydride were added dropwise in a nitrogen atmosphere at room temperature. The mixture was stirred for 20 hours at room temperature to obtain a light yellow slurry. The slurry was filtered, washed with methanol and dried at 180° C. for 8 hours under reduced pressure to obtain 5.28 kg (yield 97%) of polyimide powder.

The polyimide powder thus obtained had an inherent viscosity of 0.60 dl/g. The inherent viscosity was measured after heat-dissolving 0.5 g of the polyimide powder in 100 ml of a solvent mixture of p-chlorophenol/phenol in a ratio of 90/10 by weight and cooling to 35° C.

(2) PTFE (KTL-610: Kitamura & Co., Ltd.)

(3) PFA (PFA MP-10: Mitsui-Du Pont Fluoro Chemical Co., Ltd.)
(4) Calcium carbonate (NA-600: Nichitsu Kogyo Co., Ltd.)
(5) Mica (Mica S-325: Canadian Mica Co., Ltd.)
(6) Talc (High Filler #12: Matsumura Sangyo Co., Ltd.)
(7) Kaolin (ST Filler ST-100: Shiraishi Calcium Co., Ltd.)
(8) Graphite (KS06: Lonza Co., Ltd.)
(9) Carbon fiber (Besphite HTA: Toho Rayon Co., Ltd.)
(10) Glass fiber (Milled Fiber MF-KAc: Asahi Fiberglass Co., Ltd.)
(11) Potassium titanate fiber (Tismo N: Ohtsuka Chemical Co., Ltd.)

The above raw materials from (1) to (11) were dry blended with a Henschel mixer in a proportion by weight as illustrated in Table 1, and fed to a twin screw extruder. Melt-mixing and pelletizing were carried out under conditions of from 290° to 400° C. in cylinder temperature and from 80 to 250 rpm in number of screw revolutions.

The pellets thus obtained were injection molded to a desired shape under the following conditions; cylinder temperature of from 340° to 405° C., mold temperature of from 160° to 185° C., and injection pressure of from 500 to 1000 kg/cm². The following properties were measured on the molded pieces and results are illustrated in Table 1.

(1) Friction coefficient

A thrust type friction-abrasion tester capable of heating the opposite material was used and the test was conducted under conditions of, 1.1 kg/cm² load, 150 m/min in sliding velocity, SUJ2 opposite material (quenched), no lubrication and continuous running. When sliding time (test time) was 120 minutes, friction coefficient was measured against non-heated (room temperature) opposite material. When sliding time was 15 minutes, friction coefficient was measured against non-heated (room temperature) and heated (150° C.) opposite materials.

(2) Abrasion coefficient

The same tester as employed for measuring the friction coefficient was used. Under conditions of 1.5 kg/cm² load, 128 m/min sliding velocity, SUJ 2 opposite material (quenched), no lubrication and continuous running for 100 hours, abrasion coefficient was measured against non-heated (room temperature) opposite material. After finishing the abrasion test, magnitude of damage on the opposite material was examined and divided into the following three classes.

O ... No damage was found at all.
Δ ... Some damage was found.
X ... Remarkable damage was found.

As clearly seen in Table 1, any of the polyimide-based friction material in Examples 1–8 have excellent abrasion resistance and exhibit moderately high friction coefficients. The friction coefficient is stable against prolonged sliding time and temperature change due to heating of the opposite material. Further, no damage is observed even after long sliding time.

On the other hand, Comparative Examples 1, 2 and 3 have moderately high and stable friction coefficient, whereas they have remarkably inferior abrasion resistances.

Comparative Examples 3, 8 and 9 cause some damage to the opposite material.

Comparative Examples 4, 7, 8 and 9 have unstable friction coefficients and Comparative Example 5 is inferior in any property.

Further, Comparative Example 6 has too low a friction coefficient and is inadequate for friction material.

TABLE 1

| | | Example | | | | | | | | Comparative Example | | | | | | | | |
|---|---|---|---|---|---|---|---|---|---|---|---|---|---|---|---|---|---|---|
| | | 1 | 2 | 3 | 4 | 5 | 6 (*1) | 7 | 8 | 1 | 2 | 3 | 4 | 5 | 6 | 7 | 8 | 9 |
| Formulation (wt. part) | | | | | | | | | | | | | | | | | | |
| (1) | Thermoplastic polyimide resin | 83 | 80 | 70 | 63 | 77 | 85 | 60 | 40 | 78 | 78 | 78 | 78 | 70 | 85 | 80 | 75 | 75 |
| (2) | PTFE | 7 | | 20 | 7 | 3 | 5 | 30 | 25 | 7 | 7 | 7 | 7 | | 15 | | 10 | 10 |
| (3) | PFA | | 10 | | | | | | | | | | | | | 20 | | |
| (4) | Calcium carbonate | 10 | 10 | 10 | 30 | 20 | 10 | 10 | 35 | | | | | | | | | |
| (5) | Mica | | | | | | | | | 15 | | | | | | | | |
| (6) | Talc | | | | | | | | | | 15 | | | | | | | |
| (7) | Kaolin | | | | | | | | | | | 15 | | | | | | |
| (8) | Graphite | | | | | | | | | | | | 15 | | | | | |
| (9) | Carbon fiber | | | | | | | | | | | | | 30 | | | | |
| (10) | Glass fiber | | | | | | | | | | | | | | | | 15 | |
| (11) | Potassium titanate fiber | | | | | | | | | | | | | | | | | 15 |
| Test result | | | | | | | | | | | | | | | | | | |
| Friction coefficient | | | | | | | | | | | | | | | | | | |
| (Room temp. 15 min) | | 0.35 | 0.36 | 0.31 | 0.37 | 0.36 | 0.32 | 0.28 | 0.39 | 0.34 | 0.37 | 0.36 | 0.26 | 0.58 | 0.21 | 0.31 | 0.32 | 0.34 |
| (Room temp. 120 min) | | 0.35 | 0.38 | 0.30 | 0.39 | 0.36 | 0.31 | 0.26 | 0.39 | 0.37 | 0.34 | 0.38 | 0.32 | 0.52 | 0.20 | 0.37 | 0.41 | 0.40 |
| (150° C., 15 min) | | 0.33 | 0.39 | 0.29 | 0.37 | 0.38 | 0.30 | 0.25 | 0.37 | 0.33 | 0.32 | 0.34 | 0.27 | 0.54 | 0.20 | 0.30 | 0.39 | 0.35 |
| Abrasion coefficient cm³/kg · m | | | | | | | | | | | | | | | | | | |
| (Room temp.) | | 100 | 187 | 146 | 192 | 122 | 76 | 194 | 104 | 1025 | 2800 | 425 | 152 | 1745 | 285 | 214 | 84 | 124 |
| Damage | | O | O | O | O | O | O | O | O | O | O | O | Δ | O | X | O | O | X | Δ |

Note;
(*1) Injection molded specimen is heat-treated at 320° C. for 3 hours.

What is claimed is:

1. A polyimide-based friction material comprising:
(a) from 30 to 96 parts by weight of a thermoplastic polyimide resin essentially consisting of recurring units of the formula:

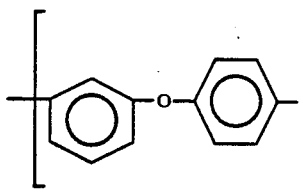

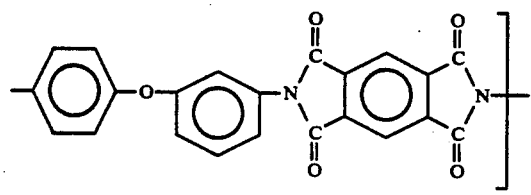

(b) from 2 to 30 parts by weight of fluoro resin, and
(c) from 2 to 40 parts by weight of calcium carbonate wherein the sum of components (a), (b) and (c) is 100 parts by weight.

2. The polyimide-based friction material of claim 1 wherein the thermoplastic polyimide resin has an inherent viscosity of from 0.35 to 0.80 dl/g.

3. The polyimide-based friction material of claim 1 wherein the content of the thermoplastic polyimide resin is from 40 to 90 parts by weight.

4. The polyimide-based friction material of claim 1 wherein the fluoro resin is selected from the group consisting of tetrafluoroethylene resin, tetrafluoroethylene-perfluoroalkyl vinyl ether copolymer, tetrafluoroethylene-hexafluoropropylene copolymer and ethylenetetrafluoroethylene copolymer.

5. The polyimide-based friction material of claim 1 wherein content of the fluoro resin is from 3 to 28 parts by weight.

6. The polyimide-based friction material of claim 1 wherein the content of the calcium carbonate is from 3 to 35 parts by weight.

7. A process for preparing a polyimide-based friction material comprising the step of molding a composition comprising:

(a) from 30 to 96 parts by weight of a thermoplastic polyimide resin essentially consisting of recurring units of the formula:

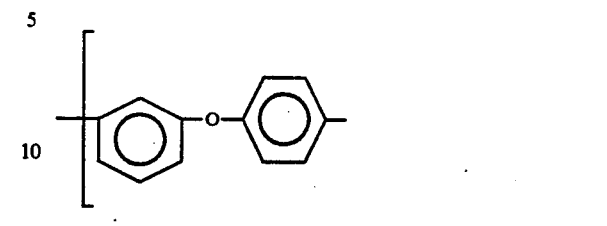

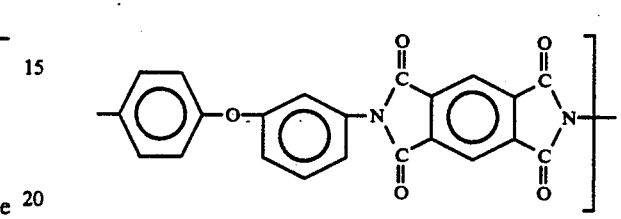

(b) from 2 to 30 parts by weight of fluoro resin, and
(c) from 2 to 40 parts by weight of calcium carbonate wherein the sum of components (a), (b) and (c) is 100 parts by weight.

8. The preparation process of claim 7 wherein inherent viscosity of the thermoplastic polyimide resin is from 0.35 to 0.80 dl/g.

9. The preparation process of claim 7 wherein the content of the thermoplastic polyimide resin is from 40 to 90 parts by weight.

10. The preparation process of claim 7 wherein the fluoro resin is selected from the group consisting of tetrafluoroethylene resin, tetrafluoroethylene-perfluoroalkyl vinyl ether copolymer, tetrafluoroethylene-hexafluoropropylene copolymer and ethylene-tetrafluoroethylene copolymer.

11. The preparation process of claim 7 wherein the content of the fluoro resin is from 3 to 28 parts by weight.

12. The preparation process of claim 7 wherein the content of the calcium carbonate is from 3 to 35 parts by weight.

* * * * *